United States Patent Office 3,527,724
Patented Sept. 8, 1970

---

3,527,724
THERMOPLASTIC RUBBER COMPRISING ETHYLENE-VINYL ACETATE COPOLYMER, ASPHALT AND FLUXING OIL
Frank J. Hendel, South Pasadena, Calif., assignor to California Institute Research Foundation, Pasadena, Calif., a corporation of California
No Drawing. Continuation-in-part of application Ser. No. 508,864, Nov. 19, 1965. This application Oct. 24, 1966, Ser. No. 588,721
Int. Cl. C08f 37/00, 45/28, 45/52
U.S. Cl. 260—28.5
1 Claim

ABSTRACT OF THE DISCLOSURE

A thermoplastic rubber is made from a mixture of between about 10% and about 50% of asphalt, between about 5% and about 30% fluxing oil, and between about 35% and about 70% of a copolymer of polyethylene and vinyl acetate.

---

The invention described herein was made in the performance of work under NASA contract and is subject to the provisions of the National Aeronautics and Space Act of 1958, Public Law 85–568 (72 Stat. 426; 42 U.S.C. 2451), as amended, and is a continuation-in-part of my copending application Ser. No. 508,864 filed Nov. 19, 1965, now abandoned.

This invention relates to a thermoplastic rubber compound which is easily molded or extruded into different shapes and objects, applied as a lining metal to concrete water tanks, swimming pools, as a sealant for coating or filling cracks in asphalt and concrete roads, especially where low temperature is a problem, and as a coating material such as for ships, soil and water tanks.

Briefly, this invention is a mixture of asphalt, a fluxing oil, and a copolymer which includes linear chains of methylene groups and polar side groups. The thermoplastic rubber of this invention has a very low glass-transition temperature. For example, it does not become brittle below 0° F. It has a softening point usually above about 160° F., and there is no exudation of blended ingredients at any temperature. There is good diffusion and evaporation of volatile light hydrocarbon solvents from it without the formation of pores. It is easily prepared and inexpensive. It can also be easily added to different formulations to enhance their properties.

Linear polymers without polar side groups, such as the well-known thermoplastic resin, polyethylene, has been mixed with petroleum products, but by itself it does not have good compatibility with petroleum oils such as fluxing oil or kerosene. The polyethylene is mixable with the oil at a high temperature, say 350° F., but on cooling, exudes a large proportion of the oil.

I have found that the addition of bulky side groups to the linear polymers makes the polymers completely compatible with petroleum products such as fluxing oil and asphalt which contains asphaltenes. Preferably, the bulky side groups are polar and include sulphur and oxygen. Examples of copolymers which provide the linear chain of methylene groups and the polar side groups are ethylene and vinyl acetate, ethylene and methyl acrylate, ethylene and methyl methacrylate. Various homologs of ethylenes, such as propylene, butene, pentene, and butadiene can be substituted for the ethylene. Apparently the polar groups on the linear chain interlock with the polar groups naturally occurring in the asphaltene to form a tough rubber-like compound which sticks tenaciously to all dry and roughened surfaces except Teflon (polytetrafluoroethylene). The presence of the fluxing oil gives the material a softening or melting point below about 200° F. so it can be melted and cast at a reasonably low temperature. Acetoxy groups are formed when ethylene is copolymerized with vinyl acetate forming a copolymer of ethylene and vinyl acetate. Ester side groups are formed when ethylene is copolymerized with methyl acrylate, methyl methacrylate, or the like. Methyl groups in the acetoxy and ester groups can be replaced by homologs such as ethyl, propyl or butyl groups.

Polyethylene containing some polyvinylacetate as a copolymer shows excellent compatibility with oil and asphalt at 250° F. to 350° F. in various proportions. Moreover, on cooling, the result is a tough thermoplastic elastomer which does not exude oil or asphalt; under certain circumstances, however, traces of oil and/or asphalt may be exuded. The elastomer also retains good tensile strength and elongation in the temperature range from −50° F. to 150° F. At temperatures below −50° F., the elastomer becomes hard but not brittle. In the preferred form of the invention, the polyethylene contains between about 20% and about 30% by weight of vinyl acetate as a copolymer, and the copolymer is present in the amount of about 30% to about 70% by weight. The fluxing oil is present in the amount between about 4% and about 50% by weight, and the asphalt between about 10% and about 65% by weight.

These and other aspects of the invention will be more fully understood from the following examples and detailed description.

EXAMPLE 1

A typical composition of the thermoplastic rubber was made by mixing 2.7 pounds of ethylene-vinylacetate copolymer containing 23.8% polyvinylacetate with .9 pound of steam-refined asphalt of ductility at 77° F. at 150 centimeters, and 1.5 pounds of kerosene having a specific gravity of 0.79. The copolymer of ethylene and vinyl acetate was blended with the kerosene and asphalt at approximately 250° F. until thoroughly mixed. The mixture was then cooled and cast into open containers. The cast product had a glass-transition temperature below −60° F. and a softening point about 200° F. There was no exudation of blended ingredients at any temperature.

EXAMPLE 2

A thermoplastic rubber was prepared by mixing the same ingredients in the same proportions as given in Example 1 but adding to it 4.5 parts by weight of normal hexane. All of the ingredients of Example 1 were heated with the solvent in a reflux condenser for two to three hours until a homogenized mixture was obtained. The mixture was then cooled and sprayed with air on to wooden and metallic surfaces. Addition of the solvent facilitates using the elastomer in various coating applications.

EXAMPLE 3

Another typical composition of the thermoplastic rubber was made by mixing 0.9 pound of semisolid steam-refined asphalt of ductility at 77° F. greater than 150 centimeters, and 0.1 pound of fluxing oil, which was a heavy hydrocarbon oil of 0.945 specific gravity and viscosity at 210° F.—70 S.S.U. obtained from the distillation of crude oil. To the above mix 1.0 pound of copolymer of 72% by weight of ethylene and 28% by weight of vinyl acetate. The copolymer was in the form of pellets ⅟₁₆ to ⅛ inch in size. Blending was achieved by leaving the entire mix in a 250° F. electric oven overnight and mixing it vigorously next morning. After cooling to room temperature a thermoplastic rubber was achieved.

EXAMPLE 4

A thermoplastic rubber composition was made by mixing 10 pounds of steam-refined asphalt with 1.5 pounds of fluxing oil, both as in Example 3, and 11.5 pounds of a copolymer of ethylene and propylene. Blending was achieved by leaving the entire mix in a 275° F. electric oven over night and mixing it vigorously next day at the same temperature. After cooling to room temperature a a thermoplastic rubber was achieved.

EXAMPLE 5

A thermoplastic rubber composition was made by mixing 12 pounds of steam-refined asphalt of ductility at 77° F. of 100 centimeters, 1 pound of fluxing oil, as in Example 3, and 7 pounds of linear polyethylene, containing 25% by weight of pendent vinyl acetate groups. Blending was achieved by preheating the mix to 250° F. and mixing it vigorously at the same temperature. After cooling to room temperature a thermoplastic rubber was achieved, which was, however, softer than the one in Example 4.

EXAMPLE 6

A thermoplastic rubber composition was made by blending 5 pounds of steam-refined asphalt with 0.5 pound of fluxing oil, and with 10 pounds of a copolymer of ethylene and vinyl acetate at 275° F. and afterwards cooling the blend to room temperature. All raw materials were the same as in Example 4. The thermoplastic rubber was much stronger and harder than the product of Example 4.

EXAMPLE 7

A thermoplastic rubber composition was as in Example 5, except kerosene was substituted for the fluxing oil. The product had good physical properties at low temperatures.

EXAMPLE 8

Thermoplastic tiles were made by casting at 270° F. the molten thermoplastic rubber prepared in Examples 1 through 5 into a horizontal mold 6 inches x 6 inches x ½ inch lined with Teflon. The mold and the thermoplastic rubber were held over night in an electric oven kept at 270° F. Next day the mold was removed and submerged in cold water to cool quickly the mold and the product. The product, a flexible, black tile, was easily removed from the mold because the thermoplastic rubber does not adhere to Teflon.

EXAMPLE 9

Another thermoplastic rubber tile was prepared as in Example 8 except a steel-wire screen 18 mesh (made of 0.025 inch wire) with 0.03 inch openings was embedded in the molten rubber. The product was much less flexible but of much greater tensile strength.

EXAMPLE 10

A thermoplastic rubber rod of ¾ inch diameter was prepared by extrusion at 250° F. of the molten thermoplastic rubber of Example 3 under pressure into cold water where it congealed.

EXAMPLE 11

Thermoplastic rubber ⅛ inch pellets were prepared by extruding molten thermoplastic rubber of Example 3 at 240° F. under pressure through a ⅛ inch opening and cutting the congealed, continuous, thin rod into ⅛ inch lengths.

EXAMPLE 12

A thermoplastic ruber strip 5 inches wide x ⅜ inch thick was prepared by extruding the molten thermoplastic rubber of Example 3 at 250° F. under pressure into cold water where it congealed. The above strip was reheated on the top surface with infrared heat so that it became tacky. The tacky surface was then covered with crushed white stone to form a white surface. The bottom surface was then reheated and in a tacky condition was applied to a concrete road and an asphalt road to form a dividing white line on each road.

EXAMPLE 13

A strip as in Example 12 was made tacky by heat and covered with ground glass to form a white road line which reflects car lights at night.

EXAMPLE 14

A strip as in Example 12 was laid cold on a preheated concrete and an asphalt road. After rolling the strip adhered to the roads, the strips were then sprinkled with *hot* white sand or white crushed stone, which was then rolled so it adhered very strongly to the thermoplastic strip. Other colors, such as yellow, can be used. An antiskid highway or runway can be prepared the same way.

EXAMPLE 15

Thermoplastic pellets from Example 11 were mixed with crushed stones (aggregates) and spread on an even surface, simulating a road substratum. Heat was then applied from top in order to melt the thermoplastic pellets. A cold asphalt-water emulsion was then placed on top of the thermoplastic-aggregate layer to provide a leveling medium (after the evaporation or running off the water). A simulated durable road surface was then achieved.

EXAMPLE 16

Cracks in an asphalt road, a concrete road, and in a tennis court were filled with finely divided dense-grade aggregates, followed by the molten thermoplastic rubber of Example 3, and topped with sand. Effective and durable patching with this combination was achieved.

EXAMPLE 17

A strip prepared like in Example 12 but only ¼ inch thick was first made tacky on the bottom and laid on top of a leaky roof. Then the top of the strip was made tacky and covered with dense-grade aggregate to provide an effective and durable roof patching with this sealant.

EXAMPLE 18

Holes at the apex of a leaky roof were covered as in Example 17 with the exception that the thermoplastic strip was pre-heated and bent to make it fit the V-shaped apex.

EXAMPLE 19

A cubical water tank was made by taking five ¼ inch square strips of the thermoplastic rubber of Example 3 and joining their ends simply by heating these ends with an infrared heater. The tank was impervious to water and algae which did not grow on the walls.

EXAMPLE 20

The water tank of Example 19 was painted with ordinary paints to the desired color. Small ceramic tiles were embedded two inches from the top on all sides simply by warming the thermoplastic rubber walls with an infrared heater to make them tacky and sticking the ceramic tiles on.

EXAMPLE 21

A letter was sealed by taking a chunk of thermoplastic rubber and heating it over a match (or candle) until the end of the thermoplastic rubber melted (and was slightly burning) and was dripping on the letter. A metallic seal was then wetted with water (or saliva) and impressed on the tacky or semi-liquid rubber.

EXAMPLE 22

A thermoplastic rubber strip was prepared, as in Example 12, except that the top tacky surface was covered with sawdust and that the bottom surface was not made tacky. Several of such strips were heated (by infrared) at the ends and joined to make a wider and longer portable surface for children's playground and for sport events (like tennis courts, running tracks, etc.).

EXAMPLE 23

A weather proof highway is built by sandwiching a thermoplastic rubber sheet about ¼ inch thick made in accordance with Example 3 and reinforced with a metal screen of about 18 mesh (1 millimeter openings) between layers of a conventional asphalt highway or street. In a typical highway, a subgrade material is disposed on the earth and covered by a coarse aggregate base, which is in turn covered by an asphalt concrete binder with a coarse aggregate base, which is in turn covered by an asphalt concrete binder with a coarse aggregate in it. The reinforced thermoplastic rubber sheet of this invention is placed on top of the asphaltic concrete binder, and then covered with the conventional asphaltic cement surface to a depth of about 1½ inches. In the past, the asphaltic surface has tended to crack so that water penetrates it. The water freezes, expands, and opens the cracks so that water can percolate down through the surface and wash out the underlying support. The layer of thermoplastic rubber in accordance with this invention prevents the penetration of water to the road base, and preserves the road even though the surface is open by cracks.

For the purpose of this invention, the term "fluxing oil" is used to mean a heavy hydrocarbon petroleum distillation product generally having a boiling point between about 150° F. and about 500° F., and having between about six and about thirty carbon atoms per molecule. The asphalt which can be used with the fluxing oil is the conventional asphaltic residue in a petroleum still.

The volatile solvent used in diluting the thermoplastic rubber includes compounds such as pentane, hexane, and heptane, and generally has a boiling point between about 96° F. and about 212° F.

The copolymer of ethylene and vinyl acetate is preferably present in the thermoplastic rubber in the amount of about 53%, but can vary between about 30% and about 70%. The product loses its strength if the copolymer is much less than 30%, and does not have the desired resiliency if the copolymer is more than about 70%. Preferably the copolymer has a molecular weight greater than about 2000, and a crystallinity less than about 40%.

Between about 20% and about 30% polyvinylacetate in the copolymer is required for the desired properties. If the vinyl acetate is much below this range, the product does not have the desired resiliency. If the vinyl acetate is much more than about 30% of the copolymer, the product has less than the desired strength.

The fluxing oil or kerosene can be varied between about 5% and about 50%. If it is less than about 5%, the product does not have the desired resiliency, and if it is more than about 50%, the product is lacking in the desired strength. Asphalt is added to the thermoplastic rubber composition in the amount between about 10% up to about 60% by weight to combine with the resin and produce the tough rubber-like composition of this invention.

The advantageous characteristics of the thermoplastic elastomer of this invention are:

(1) It has a very low glass-transition temperature below (0° F.);
(2) It has a softening point above 200° F.;
(3) It has no exudation of blended ingredients at any temperature;
(4) It has good diffusion and evaporation of light volatile hydrocarbon solvents from the elastomer without the formation of pores;
(5) It has low cost;
(6) It has ease of preparation of different formulations;
(7) It has ease of addition of various fillers;
(8) It has ease of molding and extrusion of different objects;
(9) It is easily applied as a liner or coating to concrete tanks and swimming pools, and as a sealant for filling cracks in asphalt and concrete roads, especially where low temperature is a problem; and
(10) It can be sprayed with or without volatile solvents by a stream of hot or cold pressurized air or other gases or vapors. Thus a soil may be stabilized to prevent dust and mud, and the hulls of boats and ships may be covered with a protective layer of this material to prevent corrosion and organic growth.

I claim:
1. A thermoplastic rubber comprising a mixture of a copolymer of ethylene and vinyl acetate in which the vinyl acetate is present in the amount between about 20% and about 30% by weight of the copolymer, asphaltic residue from a petroleum still, and hydrocarbon petroleum distillation product having a boiling point between about 150° F. and about 500° F. and having between about six and about thirty carbon atoms per molecule, the copolymer being present between about 35% and about 70% by weight of the mixture, the copolymer having a molecular weight greater than about 2000, and a crystallinity less than about 40%, the asphaltic residue being present between about 10% and about 50% by weight of the mixture, and the petroleum product being present in the amount between about 5% and about 30% by weight of the mixture.

References Cited

UNITED STATES PATENTS

| | | | |
|---|---|---|---|
| 2,783,162 | 2/1957 | Mollring | 106—278 |
| 3,010,899 | 11/1961 | Boyer. | |
| 3,249,567 | 5/1966 | Vigneault. | |
| 3,291,767 | 12/1966 | Zaayenga | 106—279 |
| 3,414,533 | 12/1968 | Trieschmann et al. | 260—28.5 |

FOREIGN PATENTS

| | | |
|---|---|---|
| 642,091 | 7/1964 | Belgium. |
| 969,169 | 9/1964 | Great Britain. |
| 6,413,985 | 6/1965 | Netherlands. |

ALLAN LIEBERMAN, Primary Examiner

U.S. Cl. X.R.

260—33.6